United States Patent [19]
Roberts

[11] Patent Number: 5,348,443
[45] Date of Patent: Sep. 20, 1994

[54] WIND IMPELLER

[76] Inventor: Victor N. Roberts, 74-8490 King George Hwy., Surrey, B.C., Canada, V3W 5B7

[21] Appl. No.: 104,973

[22] Filed: Aug. 10, 1993

Related U.S. Application Data

[63] Continuation-in-part of Ser. No. 922,449, Jul. 30, 1992, abandoned.

[51] Int. Cl.⁵ .................................................. F03D 7/04
[52] U.S. Cl. .......................................... 416/9; 415/2.1; 415/4.1
[58] Field of Search .................... 415/2.1, 4.1, 4.2, 4.3, 415/4.4, 4.5, 905, 907, 908; 416/9, 13, 14, 15

[56] References Cited

U.S. PATENT DOCUMENTS

| | | | |
|---|---|---|---|
| 657,420 | 9/1900 | Jaycox | 415/2.1 |
| 698,409 | 4/1902 | Neuser | 415/2.1 |
| 1,361,019 | 12/1920 | Cook | 416/13 |
| 1,397,031 | 11/1921 | Boston | 415/2.1 |
| 1,476,323 | 12/1923 | Berger | 416/13 |
| 4,088,419 | 5/1978 | Hope et al. | 415/4.4 |
| 4,606,697 | 8/1986 | Appel | 415/4.4 |
| 4,787,819 | 11/1988 | Bond | 416/13 |

FOREIGN PATENT DOCUMENTS

| | | | |
|---|---|---|---|
| 64440 | 11/1982 | European Pat. Off. | 415/4.2 |
| 1373858 | 2/1988 | U.S.S.R. | 415/4.4 |

Primary Examiner—John T. Kwon
Attorney, Agent, or Firm—Oyen Wiggs Green & Mutala

[57] ABSTRACT

A wind impeller that includes at least two rotor assemblies mounted to a base for rotation. Each rotor assembly has a plurality of spaced arms extending radially from a rotation axis with a vane attached at the end of each arm. The at least two rotor assemblies are mounted such that the rotors are rotatable through a first region in which the arms of the rotor assemblies converge and intermesh to travel along the same path and a second region in which the arms of the rotor assemblies diverge to travel along separate paths. A baffle plate is mounted to the base for directing wind against the vanes when in the second region to maximize the effective driving force of the wind.

14 Claims, 3 Drawing Sheets

WIND IMPELLER

CROSS-REFERENCE TO RELATED APPLICATIONS

This application is a continuation-in-part of U.S. patent application Ser. No. 07/922,449 filed Jul. 30, 1992, now abandoned.

FIELD OF THE INVENTION

This invention relates to an apparatus for harnessing wind power.

BACKGROUND OF THE INVENTION

Apparatus in the form of windmills and the like are well known for harvesting wind energy and converting it into more useful forms such as mechanical or electrical energy.

Modern windmill devices have developed into fairly complex pieces of equipment that are expensive to assemble and maintain. The present invention provides a wind impeller that is of very simple yet rugged construction that automatically exposes a large surface area when moving with the wind and a small surface area when moving against the wind to maximize the driving force of the wind.

SUMMARY OF THE INVENTION

Accordingly, the present invention provides a wind impeller comprising:
a base;
at least two rotor assemblies mounted to the base for rotation, each rotor assembly having a plurality of spaced arms extending radially from a rotation axis with a vane attached at the end of each arm, the at least two rotor assemblies being mounted such that the rotors are rotatable through a first region in which the arms of the rotor assemblies converge and intermesh to travel along the same path and a second region in which the arms of the rotor assemblies diverge to travel along separate paths; and
wind directing and shielding means pivotally mounted to the base for directing wind against the vanes when in the second region to maximize the effective driving force of the wind.

BRIEF DESCRIPTION OF THE DRAWINGS

Aspects of the present invention are illustrated, merely by way of example, in the accompanying drawings in which.

DESCRIPTION OF THE PREFERRED EMBODIMENTS

Figure 1:
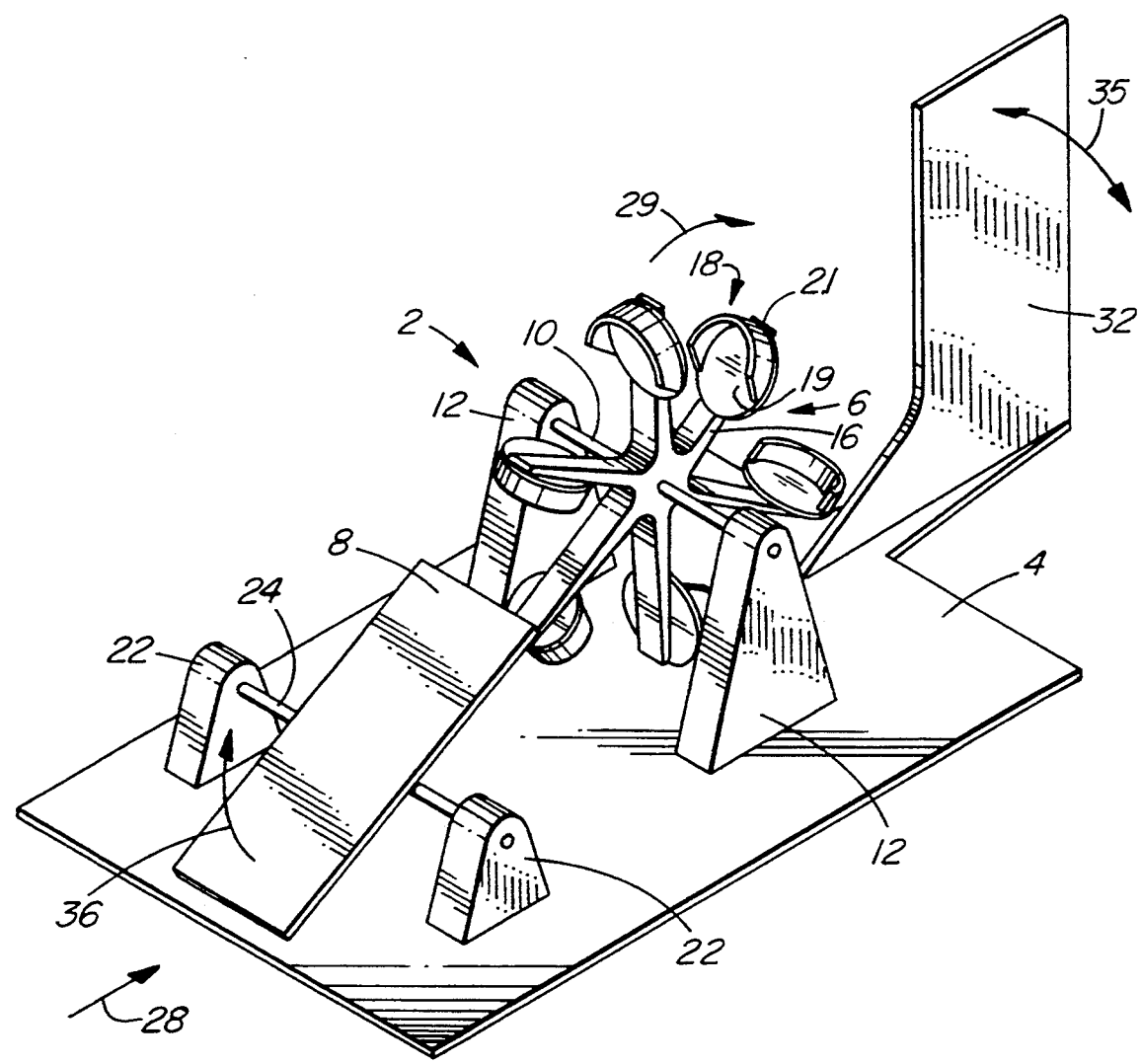
FIG. 1 is a perspective view of a first embodiment of the wind impeller.

Referring to FIG. 1, there is shown a perspective view of a preferred embodiment of a wind impeller 2 according to the present invention comprising a base 4, a rotor assembly 6, and wind directing and shielding means in the form of baffle plate 8.

Rotor assembly 6 is mounted to base 4 through a pair of spaced bearing blocks 12 that rotatably support axle 10 to which the rotor assembly is rigidly affixed. The rotor assembly has a plurality of spaced arms 16 radially extending from axle 10. There is a vane 18 attached at the end of each arm. In the present embodiment, each vane 18 comprises a flat surface 19 formed with a raised peripheral edge 21 extending about a portion of the flat surface. As best shown, in FIG. 2, the surface 19 can be circular and the raised peripheral edge extends about substantially half the circumference of the surface.

Figure 3:
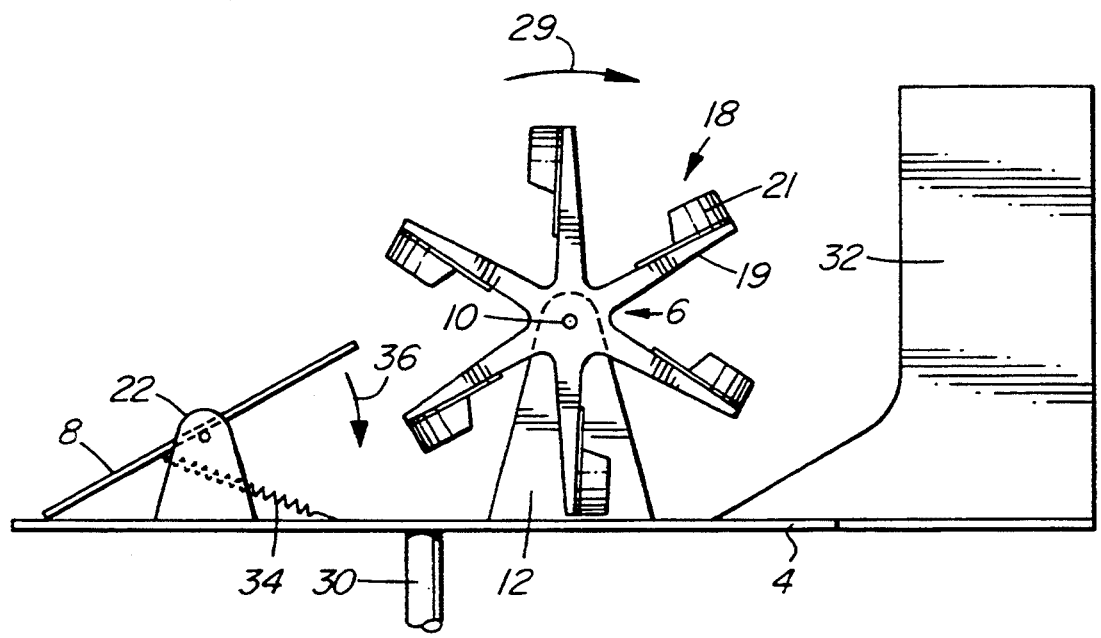
FIG. 3 is a side elevation view of the first embodiment.
Figure 4:
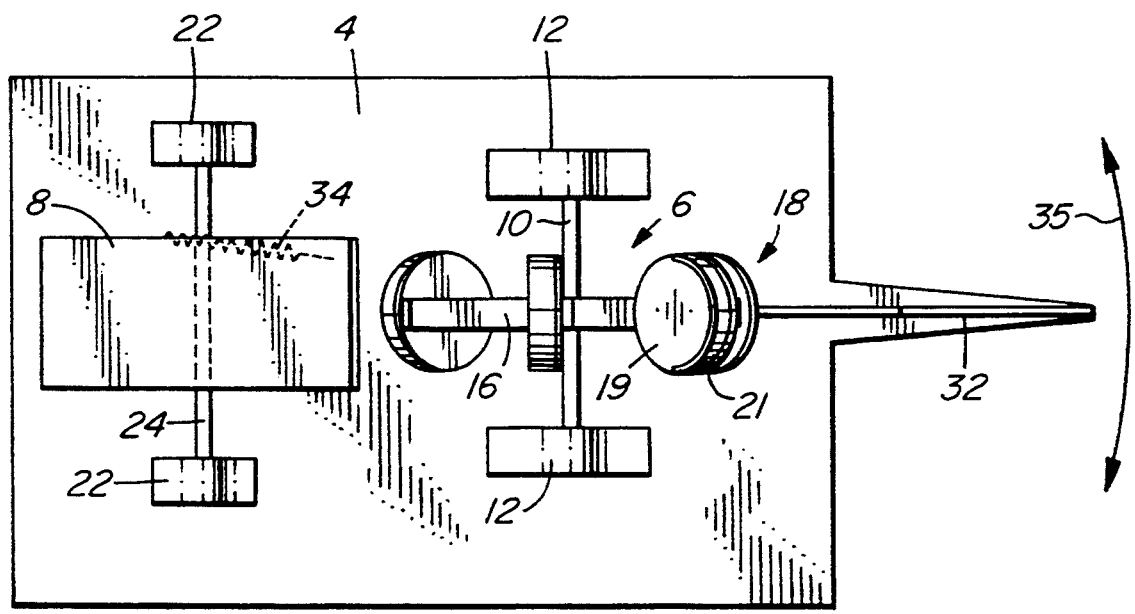
FIG. 4 is a plan view of the first embodiment.

Wind blowing in the direction indicated by arrow 28 acts to drive rotor assembly 6 in the direction indicated by arrow 29 in FIGS. 1 and 3 about axle 10. Rotor assembly 6 is used to drive a generator or like equipment through a power take off arrangement (not shown) incorporated into axle 10. In order to ensure that the rotor assembly of the present invention is always aligned correctly with the wind, base 4 is mounted for pivotal movement about a post 30 extending from the bottom of the base. There are means for aligning the rotor assembly with the wind provided in the form of vertical fin 32 extending from the base. The wind blowing on fin 32 rotates the entire base 4 in the direction of arrow 35 to ensure proper alignment of the rotor assembly with the wind.

Figure 2:
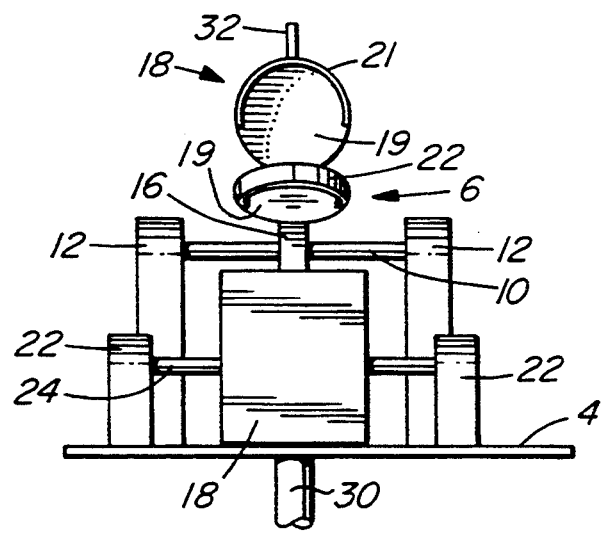
FIG. 2 is an end elevation view of the first embodiment.

Directly in front of the rotor assembly, wind directing and shielding means in the form of baffle plate 8 are provided. Baffle plate 8 is rigidly attached to axle 24 which is pivotally mounted between a pair of bearing blocks 22. Baffle plate 8 acts to direct wind against the vanes in such a manner as to regulate the effective driving force of the wind. Baffle plate 8 is mounted up wind of rotor assembly 6 and is pivotable by the force of the wind to direct wind toward certain of the vanes and to shield certain of the vanes from the wind in order to regulate the effective driving force of the wind. This arrangement is best shown in FIG. 3. As rotor assembly 6 rotates about axle 10 in the direction of arrow 29, vanes 18 above the axle are driven by the wind while vanes 18 below the axle are rotating into the wind. Baffle plate 8 in the position shown in FIG. 3 is a flat surface that acts to deflect substantially all wind onto each vane rotating past the baffle member with the wind and to substantially shield vanes rotating toward the baffle member against the wind. Referring to FIG. 2, it can be seen how the baffle plate shields the lower vanes rotating into the wind.

The flat surface 19 and raised peripheral edge 21 of vanes 18 define an enclosed region to efficiently intercept and catch the re-directed wind such that a force is directed on each vane causing the rotor assembly to rotate.

Means for automatically controlling the pivoted angle of the baffle member according to wind speed are also provided in the form of spring 34 extending between base 4 and baffle plate 8. Spring 34 acts to control the angle of the baffle plate so that the effective driving force of the wind is regulated. Normally, spring 34 biases baffle plate 8 to the angled position show in FIG. 3. Spring 34 resists the force of the wind tending to move baffle plate 8 from an angled position with respect to the wind to a position parallel to the wind flow. Baffle plate 8 adopts the angled position illustrated in the Figures at low wind speeds such that substantially all wind is directed to the vanes moving with the wind and the vanes moving against the wind are substantially shielded. At high wind speeds, the force of the wind is sufficient to overcome the biasing force of spring 34 and baffle plate 8 is rotated in the direction of arrow 36 in FIGS. 1 and 3 to a position parallel to the wind flow such that the wind is free to blow on vanes moving against the wind for a braking effect. This ensures that the rotor assembly of the present invention does not exceed its rated speed.

Figure 5:
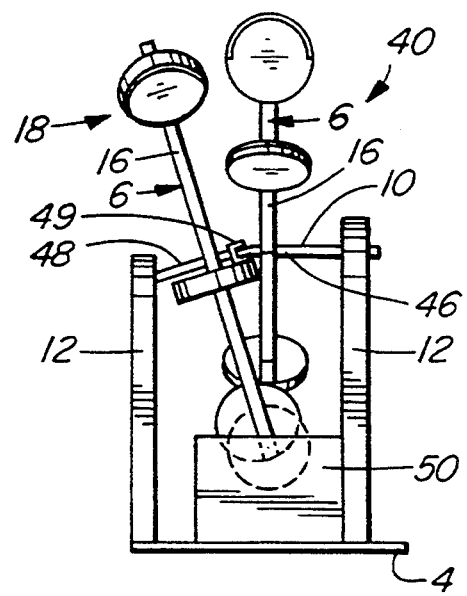
FIG. 5 is a front view of a second embodiment of the wind impeller that uses at least two associated rotors for harnessing wind power.
Figure 6:
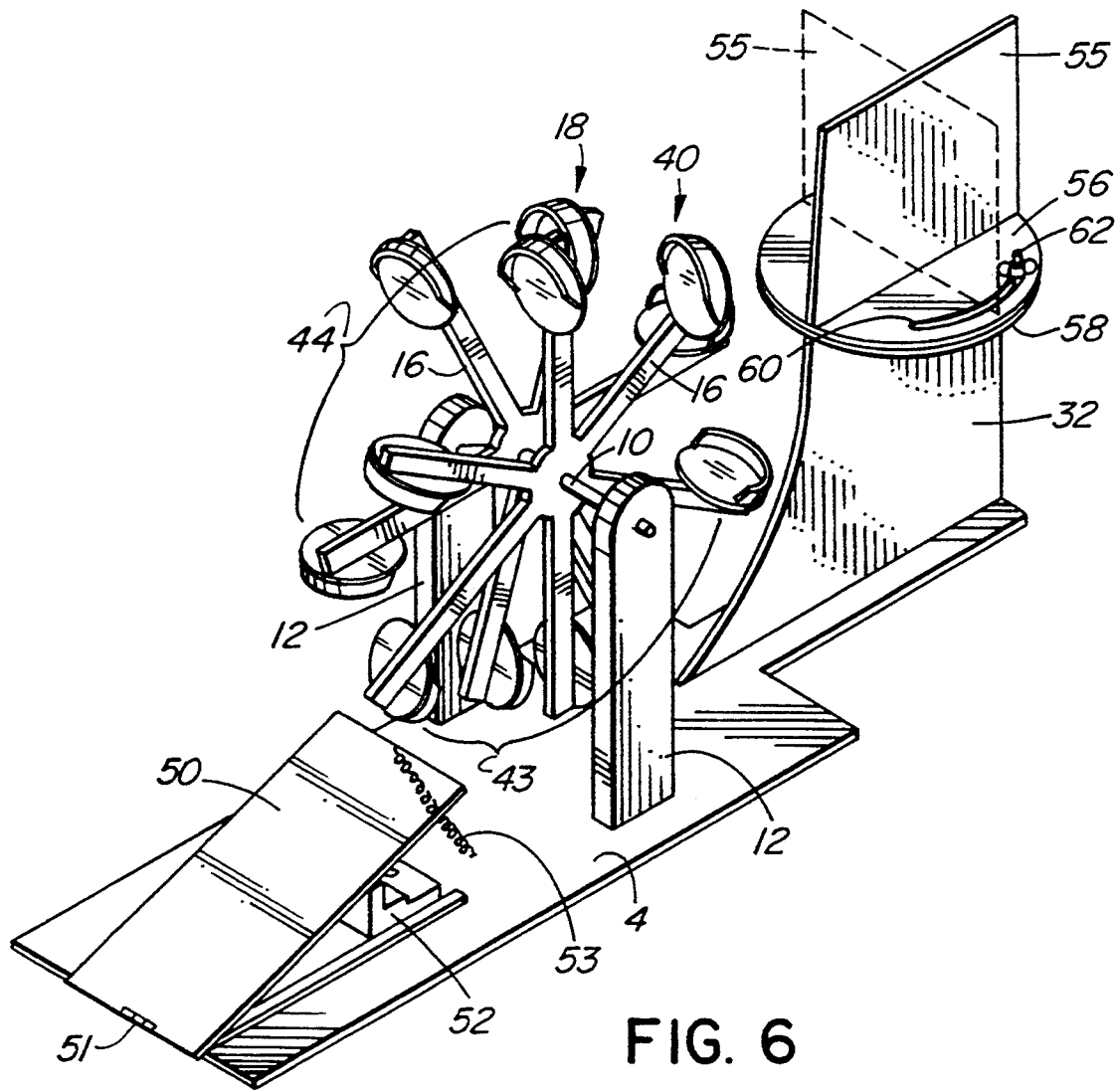
FIG. 6 is a perspective view of the wind impeller of FIG. 5.

FIGS. 5 and 6 illustrate a second embodiment of the present invention that employs at least two co-operating rotor assemblies to harness wind power. In FIGS. 5 and 6, parts analogous to the first embodiment are labelled with the same reference number.

The second embodiment includes a base 4 that is mounted for rotatable movement so as to be aligned with the wind. Mounted atop base 4 between bearing blocks 12 is the compound rotor structure 40 of the present embodiment. Rotor structure 40 comprises at least two rotor assemblies 6 mounted for rotation. Each rotor assembly 6 has a plurality of spaced arms 16 extending radially from an axle 10 with a vane 18 attached at the end of each arm.

The at least two rotor assemblies 6 are mounted such that the rotors are rotatable through a first region 43 in which the arms of the rotor assemblies converge and intermesh to travel along the same path and a second region 44 in which the arms of the rotor assemblies diverge to travel along separate paths. In the illustrated embodiment, two rotor assemblies 6 are shown, but it will be apparent to a person skilled in the art that more than two rotors can be placed together in the manner of the present embodiment. Compound rotor structure 42 is formed by having axle 10 separated into two portions 46 and 48 joined by universal joint means 49. Therefore, each rotor assembly 6 is mounted for rotation about its own rotation axis. Arms 16 of each rotor assemblies extend in a plane and the two rotor assemblies are mounted at an angle to each other such that the rotor arms intersect in first region 43 and diverge in second region 44.

Wind directing and shielding means in the form of baffle member 50 are pivotally mounted to base 4 for directing wind against the vanes 18 of the rotor assemblies. In the embodiment of FIGS. 5 and 6, baffle member 50 is positioned up wind of the two rotor assemblies and acts to direct wind upwardly toward the vanes 18 in second region 44 and to shield the vanes from the wind in first region 43. This arrangement ensures that the vanes 18 of the two rotor assemblies are exposed to the wind to the maximum possible extent when the rotor arms have diverged to maximize the force exerted by the wind when the vanes are moving with the wind. When the rotor arms are in first region 43, they are moving against the wind. In first region 43, the rotor arms are interfitted between each other to present a reduced profile to minimize the surface area exposed to the wind.

In the illustrated embodiment of FIGS. 5 and 6, pivotable baffle member 50 is attached by hinge 51 to base 4. Baffle member 50 is pivoted to a pre-determined angle and held at a fixed angle by block 52. Block 52 is slidable on base 4. A spring 53 extends between baffle member 50 and base 4 to urge the member into contact with block 52.

The embodiment of FIGS. 5 and 6 can also use the wind directing and shielding means of the first embodiment which automatically adjusts for wind speed.

The wind impeller of FIGS. 5 and 6 uses a vertical tail fin 32 to maintain alignment with the wind. Tail fin 32 can also include braking means in the form of a pivotable upper section 55 of vertical fin 32 that is rotatable out of the plane of the vertical fin to cause the base to rotate out of the wind thereby causing the rotor assemblies to stop rotating. Upper section 55 is mounted to an upper disc section 56 that is rotatably mounted atop a lower disc section 58 attached to a lower section of tail fin 32. Slots 60 are formed in one of the disc sections and pins 62 extend from the other disc section through slots 60 to permit relative rotary movement between the two disc section.

The wind impeller of FIGS. 5 and 6 provides a rotary device that automatically exposes the maximum surface area when moving with the wind to maximize the driving force of the wind and, at the same time, exposes the minimum surface area when moving against the wind to minimize the braking force of the wind on the rotor. The present invention provides an impeller that has relatively few moving parts and is easy to construct and operate.

Although the present invention has been described in some detail by way of example for purposes of clarity and understanding, it will be apparent that certain changes and modifications may be practised within the scope of the appended claims.

I claim:

1. A wind impeller comprising:
   a base having a windward end and a leeward end;
   at least two rotor assemblies mounted to the base for rotation, each rotor assembly having a plurality of spaced arms extending radially from a rotation axis with a vane attached at the end of each arm, the at least two rotor assemblies being mounted such that the rotors are rotatable through a first region in which the arms of the rotor assemblies converge and intermesh to travel along the same path and a second region in which the arms of the rotor assemblies diverge to travel along separate paths;
   a baffle member pivotally mounted to the base on a windward side of the rotor assembly for directing a wind blowing in a direction from the windward end of the base toward the leeward end of the base against the vanes when the vanes are in the second region and deflecting the wind away from the vanes when the vanes are in the first region; and,
   bias means for urging the baffle member, against the wind, into an inclined position with respect to said base such that, at higher wind speeds, the force of the wind pivots the baffle member into a position where less wind is deflected from the vanes in the first region in which the arms of each rotor assemblies extend in a plane and at least two rotor assemblies are mounted such that the planes of the rotors are at angles to each other and intersect in the first region.

2. A wind impeller as claimed in claim 1 in which each rotor assembly is mounted to its own rotation axis and the rotation axes of the rotor assemblies are joined by universal joint means.

3. A wind impeller as claimed in claim 1 in which the rotor assemblies drive a generator.

4. A wind impeller as claimed in claim 1 in which the base is mounted for pivotal movement and includes means for aligning the rotor assemblies with the wind.

5. A wind impeller as claimed in claim 1 in which each vane comprises a flat surface formed with a raised peripheral edge extending about a portion of the flat surface.

6. A wind impeller as claimed in claim 1 in which the baffle member comprises a flat surface pivotable about an axis and variably positionable to deflect wind onto each vane rotating past the baffle member with the wind and to substantially shield vanes rotating toward the baffle member against the wind.

7. A wind impeller as claimed in claim 1 in which the means for automatically controlling the angle of the baffle member comprises a resilient biasing member extending between the base and the baffle member to resist the force of the wind tending to move the baffle member from an angled position to a position parallel to the wind flow whereby movement of the baffle member is regulated between a first position at low wind speeds in which substantially all wind is directed to the vanes moving with the wind in the second region and the vanes moving against the wind in the first region are substantially shielded, and a second position at high wind speeds in which the baffle plate is parallel to wind flow and the wind is free to blow on vanes moving against the wind in the first region for a braking effect.

8. A wind impeller as claimed in claim 4 in which the means for aligning the rotor assembly in a vertical fin attached to the base.

9. A wind impeller as claimed in claim 5 in which each vane is circular and the raised peripheral edge extends about substantially half the circumference of the circular vane.

10. A wind impeller as claimed in claim 6 including means for automatically controlling the pivoted angle of the baffle member according to wind speed such that the effective driving force of the wind is regulated.

11. A wind impeller as claimed in claim 8 including a braking means for the rotor assembly.

12. A wind impeller as claimed in claim 11 in which the braking means comprises a pivotable section of the vertical fin that is rotatable out of the plane of the vertical fin to cause the base to rotate.

13. An impeller for harnessing the energy of a wind blowing in a first direction, said impeller comprising:
  a first rotor assembly comprising a first shaft pivotally mounted to a frame for rotation about a first axis and a plurality of vanes fixed to and spaced apart from said first shaft for travel in a first circular path about said first axis, said first axis generally perpendicular to said first direction;
  a second rotor assembly comprising a second shaft pivotally mounted to said frame for rotation about a second axis and a plurality of vanes fixed to and spaced apart from said second shaft for travel in a second circular path about said second axis, said second axis generally perpendicular to said first direction and inclined at an obtuse angle to said first axis;
  said vanes on said first rotor assembly intermeshing with said vanes on said second rotor assembly in a first region of said first and second paths and not intermeshing in second regions of said first and second paths;
  mechanical coupling means between said first and second shafts for maintaining relative intermeshing alignment of said vanes on said first and second rotor assemblies in said first region;
  baffle means for shielding said vanes in said first region from a wind blowing in said first direction; and
  power take-off means for removing rotational energy from said first shaft.

14. The impeller of claim 13 wherein said baffle means comprise a member pivotally mounted to said frame upwind from said first region of said rotors and bias means for pivoting said member against said wind from a position where said member does not block said first region from said wind to toward a position wherein said member substantially blocks said first region from said wind.

* * * * *